United States Patent
Steinlage et al.

(10) Patent No.: US 7,806,197 B2
(45) Date of Patent: Oct. 5, 2010

(54) SPLIT ROLLING BASKET

(75) Inventors: David L. Steinlage, Adel, IA (US); Vernon Eugene Friedley, Altoona, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/854,158

(22) Filed: Sep. 12, 2007

(65) Prior Publication Data

US 2009/0065222 A1    Mar. 12, 2009

(51) Int. Cl.
*A01B 49/02* (2006.01)

(52) U.S. Cl. .................. 172/176; 172/145; 172/151; 172/177; 172/264

(58) Field of Classification Search .......... 172/27, 172/28, 142, 145, 146, 149, 151, 177, 181, 172/45, 176, 540, 701, 552, 553, 554, 556, 172/557; 460/30–33; 56/500, 504, 294, 56/52, 104, 105, 56, 60, 505, DIG. 1, DIG. 9
See application file for complete search history.

(56) References Cited

U.S. PATENT DOCUMENTS

| 718,513 | A | | 1/1903 | Packham | |
|---|---|---|---|---|---|
| 732,623 | A | * | 6/1903 | Elison | .............. 172/507 |
| 2,701,732 | A | | 7/1949 | Van Dorn | |
| 3,186,497 | A | * | 6/1965 | Forbes | ............... 172/548 |
| 3,202,221 | A | * | 8/1965 | Monk et al. | .............. 172/63 |
| 4,062,408 | A | * | 12/1977 | Enters et al. | ........... 172/123 |
| 4,213,408 | A | * | 7/1980 | West et al. | ............. 111/194 |
| 4,508,177 | A | * | 4/1985 | Wiser | ............... 172/177 |
| 4,590,869 | A | | 5/1986 | Steilen | |
| 5,020,602 | A | * | 6/1991 | Dellinger | ............ 172/21 |
| 5,433,533 | A | | 7/1995 | Imazaike | |
| 5,474,135 | A | * | 12/1995 | Schlagel | ............ 172/151 |
| 6,068,061 | A | * | 5/2000 | Smith et al. | ............ 172/139 |
| 6,330,922 | B1 | * | 12/2001 | King | ............... 172/166 |
| 6,523,618 | B2 | * | 2/2003 | Firdaus | ............... 172/540 |
| 6,761,120 | B2 | * | 7/2004 | Kovach et al. | ......... 111/140 |
| 6,871,709 | B2 | * | 3/2005 | Knobloch et al. | ....... 172/145 |
| 7,048,069 | B1 | | 5/2006 | Bollich | |
| 7,073,949 | B2 | | 7/2006 | Ruckle et al. | |

* cited by examiner

*Primary Examiner*—Robert E Pezzuto
*Assistant Examiner*—Matthew D Troutman

(57) ABSTRACT

A strip tillage implement includes a single, center-mounted arm located directly above the row area of a strip-till berm. Basket halves are rotatably connected to opposite sides of the arm in cantilever fashion to eliminate outer support arms. Residue flow encounters rolling baskets rather than fixed arms so that catching, flipping and twisting of residue is minimized and plugging in high residue conditions is reduced. A single, center-mounted bearing and simplified basket halves reduce the cost and complexity of the implement.

2 Claims, 3 Drawing Sheets

SPLIT ROLLING BASKET

FIELD OF THE INVENTION

The present invention relates generally to strip tillage implements and, more specifically, to rolling basket structure for such implements.

BACKGROUND OF THE INVENTION

Numerous growers are changing from no-till or minimum tillage methods to strip tillage methods to reduce production costs and increase crop yields. Strip tillage machines typically work the soil in a zone and apply fertilizer. The strip tillage operation is completed in the fall, winter and spring seasons in the United States in varying conditions. When the strip tillage implement is used in the spring just prior to planting of the crop, a rolling basket may be attached behind a coulter, row cleaner, shank and closing disc to form a berm that is conducive to the planting and uniform germination of seeds.

Currently available rolling baskets are typically constructed from flat metal bars which chop up dirt clods as they roll over the berm. Some baskets have a concave cut-out to provide a berm with several inches of elevation. Other baskets utilize flat bars to make a relatively flat berm. Several types of rolling baskets are available, but most or all of such baskets encounter residue problems. The residue level of a strip-tilled field ranges from light soybean stubble to heavy standing corn stubble, and in the heavy residue conditions two stationary spaced mounting arms which support the basket are located in high residue flow areas created by the row cleaners or other tools located forwardly of the basket. The mounting arm on one side of the basket is closely adjacent the mounting arm of the adjacent basket. The two adjacent brackets catch, flip and twist residue, and this residue action causes plugs in high residue conditions such as encountered in corn stubble.

SUMMARY OF THE INVENTION

The present invention provides a single, center-mounted arm located directly above the row area of a strip-till berm. Basket halves are rotatably connected to the arm on opposite sides of the arm so the residue flow encounters rolling baskets rather than fixed arms so that catching, flipping and twisting of residue is minimized and plugging in high residue conditions is reduced or eliminated. A single arm and bearing mount arrangement simplifies construction and reduces cost compared to baskets with multiple arm supports. The single arm-supported baskets are self-cleaning, and the basket structure works more effectively in wet and heavy residue conditions than most previously available structures.

These and other objects, features and advantages of the present invention will become apparent to one skilled in the art from the description which follows taken in view of the drawings.

DESCRIPTION OF THE PREFERRED EMBODIMENT

Figure 1:
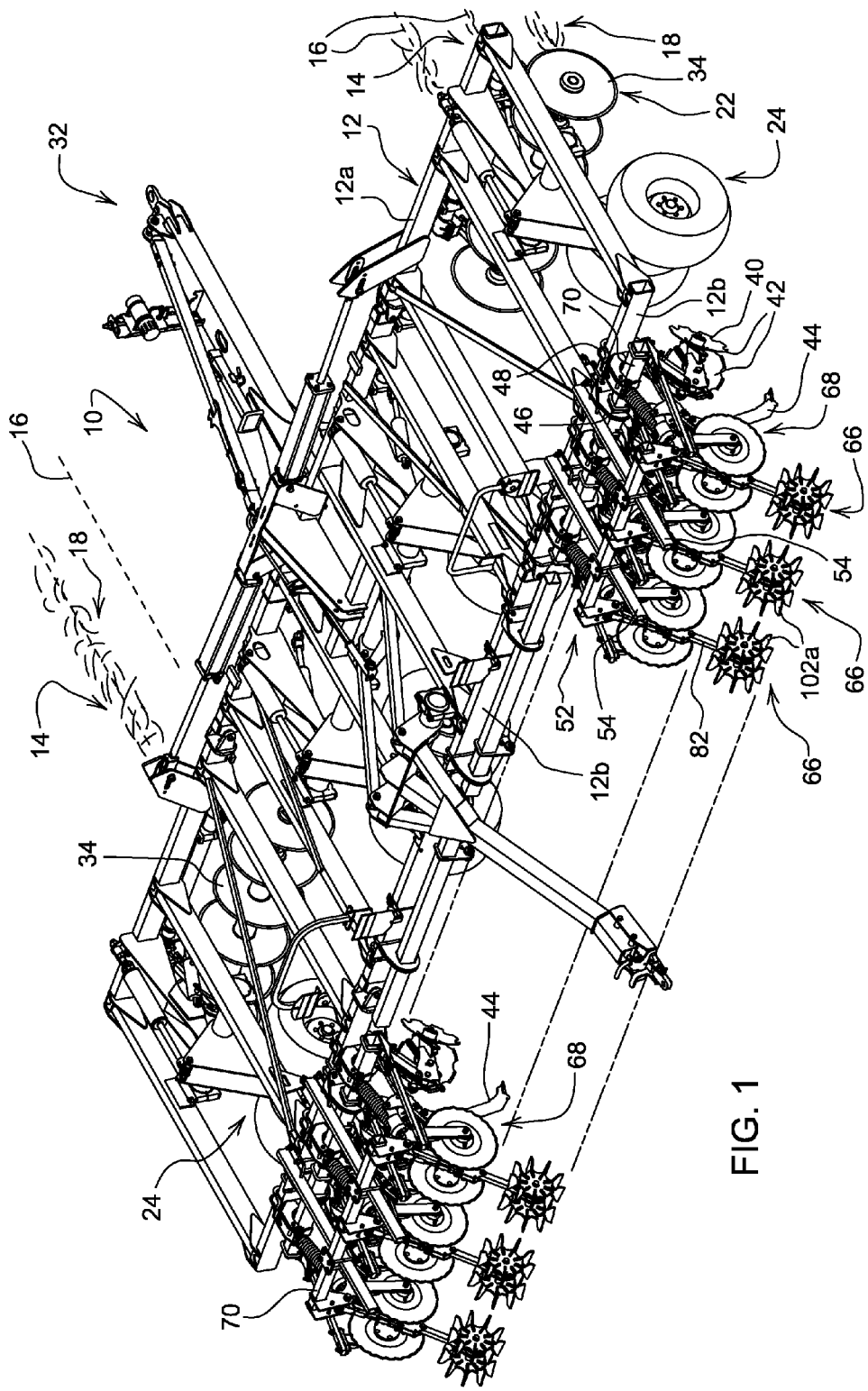
FIG. 1 is a front perspective view of a strip tillage machine including rolling basket structure.

Referring now to FIG. 1 therein is shown a strip tillage implement 10 having a main frame 12 supported for forward movement over soil with residue 14 located generally in crop rows 16 on berms 18. Strip tillage tools 40 and 22 are supported from the frame 12 rearwardly and forwardly, respectively, of lift and depth control wheel assemblies 24. A forward hitch 32 is adapted for connection to a tractor (not shown).

The forward tools 22 include a coulter 34 supported from the forward beam 12a of the frame 12 at each crop row 16. The coulter provides a centrally located slit in the corresponding berm 18. The rearward strip tillage tools, shown as row cleaners 40, are supported from the rearward beam 12b with rearwardly diverging angled discs 42 for clearing residue from an area on opposite sides of the central slit. A shank 44 is supported from a spring trip shank assembly 46 connected by a bracket 48 to the rearward beam 12b. Each shank 44 is aligned with the corresponding coulter 34.

Figure 2:
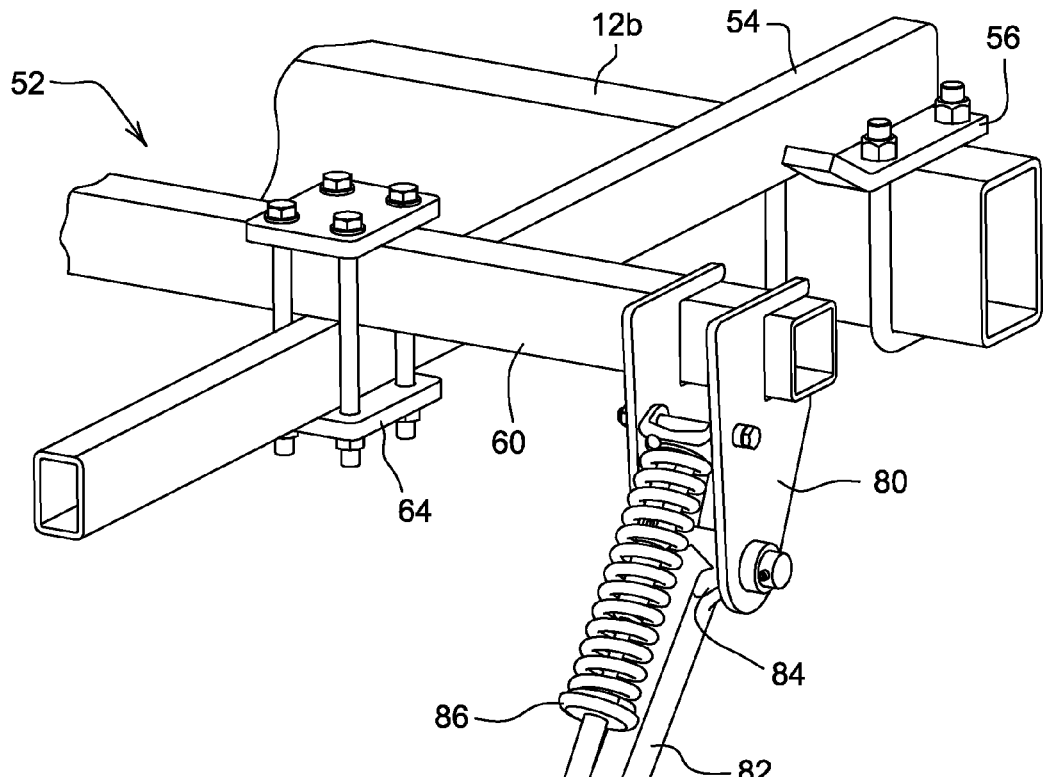
FIG. 2 is an enlarged perspective view of the rolling basket structure for the strip tillage machine of FIG. 1.
Figure 2:
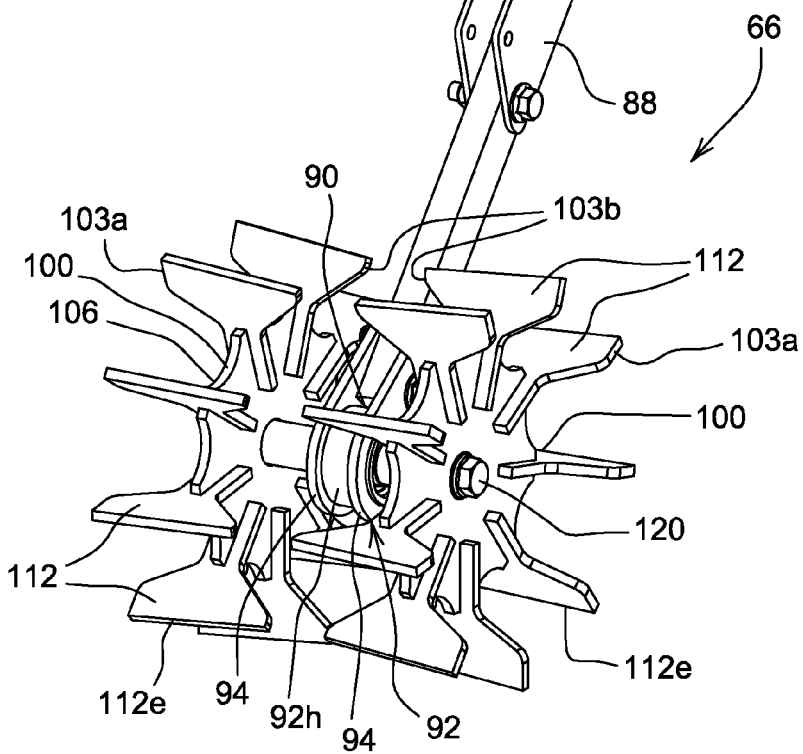

A rear support frame assembly 52 with fore-and-aft extending drawbar members 54 is connected to the rearward beam 12b by frame brackets 56 (FIG. 2). The drawbar members 54 extend rearwardly from the top of the beam 12b, and a transversely extending cross frame member 60 is supported above the drawbar members 54 by brackets 64. Split rolling basket assemblies 66 extend downwardly and rearwardly from the member 60, and closing disc assemblies 68 are supported from a closing disc frame beam 70 (FIG. 1) located behind the rear beam 12b.

The split rolling basket assemblies 66 include a bracket 80 (FIG. 2) pivotally supporting a downwardly and rearwardly directed basket drawbar or arm 82 at an upper pivot 84 located below the member 60. A spring assembly 86 has an uppermost end supported by the bracket 80 and a lowermost end connected by an arm bracket 88 at bolt hole locations 88a (FIG. 3) centrally located between the pivot 84 and a lower connecting or tool-mounting end 90.

Figure 3:
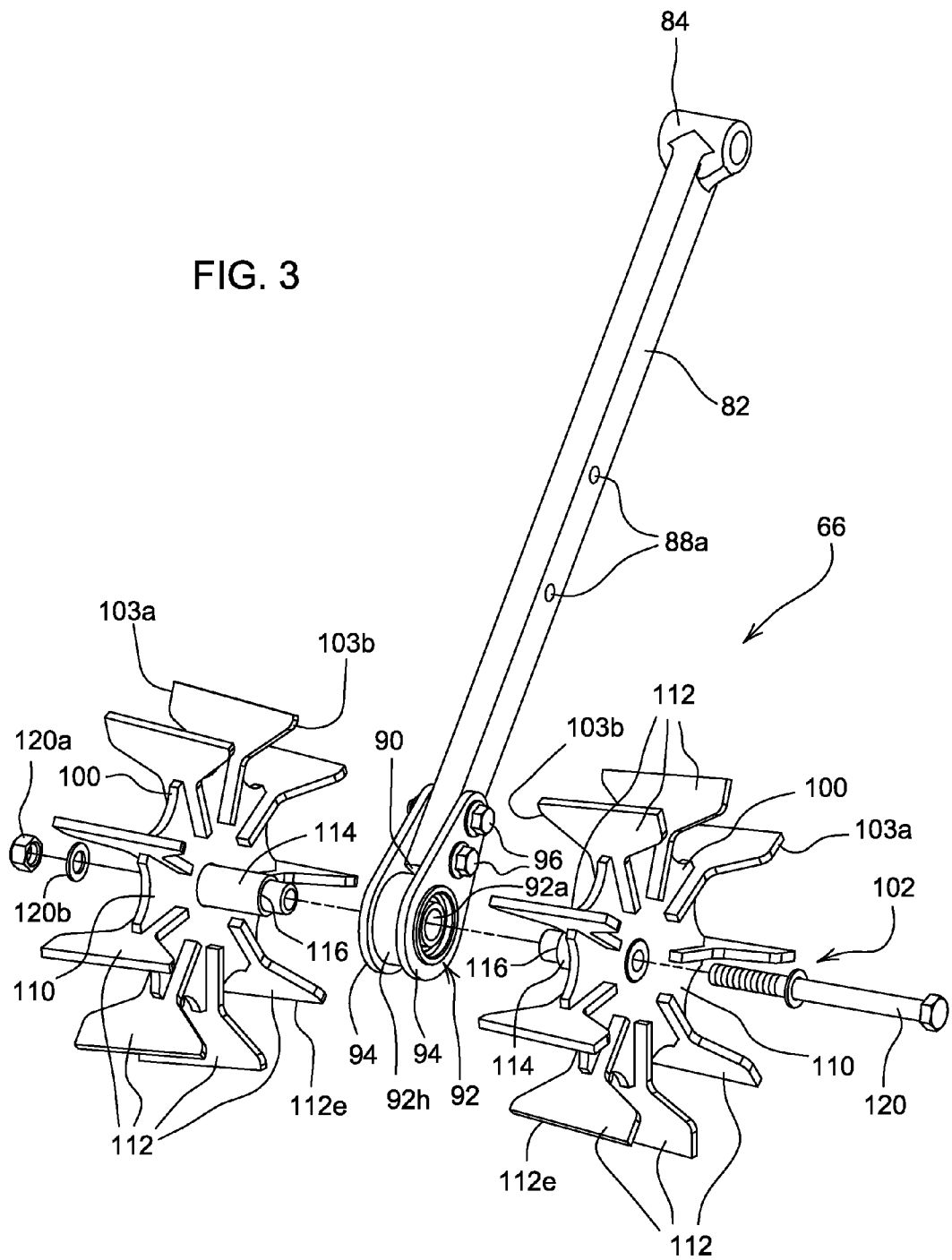
FIG. 3 is an exploded view of a portion of the rolling basket structure of FIG. 2.

The lower connecting end 90 includes a bearing assembly 92 with a housing 92h having transversely spaced identical apertured plates 94 connected by bolts 96 to the arm 82. The bearing assembly 92 as shown in FIGS. 2 and 3 includes a single pre-lubricated and permanently sealed bearing with double row ball bearings and an inner race 92a. The bearing is permanently secured within the apertures of the plates 94 as shown in FIG. 3.

Identical basket half sections 100 are rotatably mounted on opposite sides of the arm 82 in cantilever fashion by an axle assembly indicated generally at 102 in FIG. 3 extending outwardly on each side of the bearing assembly 92 so that axially outermost basket section sides 103a that extend laterally and radially outwardly from an inner support edge or periphery 106 rotate free of fixed members such as support arms or the like. The basket half sections 100 on each arm 82 rotate about the axis of the axle assembly 102 so that the outermost portions 102a (FIG. 1) of both of the sections extend radially outwardly from the axle assembly a generally equal distance. Axially innermost section sides 103b rotate closely adjacent the lower end 90 of the arm 82. Therefore, as can be best appreciated from FIG. 1, residue that passes between the sides 103a of adjacent basket assemblies 66 will not catch, flip or twist about any fixed support members or other non-rotating structure between the basket assemblies. The single arm 82 acts between the cantilevered basket half sections 100 to help clean the basket assemblies 66.

Referring to FIG. 3, the basket half sections 100 each include a generally planar support plate 110 defining the edge or periphery 106 (FIG. 2) and planar clod-breaking members 112 having outermost edges 112e supported from the plate 110 and extending transversely on either side of the plate 110. The edges 112e on a pair of basket sections 100 cover a substantial portion of the berm width and can be generally horizontal for a flat berm or angled from the horizontal to provide a shaped berm. Bushings 114 with stepped portions 116 are welded perpendicular to the central portion of the plates 110. An axle or bolt 120 secures the inner ends of the bushings 114 within the inner race 92 with the stepped portions 116 abutting the opposite faces of the inner race 92a. A nut 120a and washer 120b tightened on the threaded end of the bolt 120 maintains the basket sections 100 in position on opposite sides of the bearing 92. As shown, the basket sections 100 are generally identical with the members 112 supported in slots spaced equidistantly about the periphery of the plate 110. The areas between the members 112 are generally arc-shaped and concave outwardly. The innermost sides 103b are transversely spaced apart a distance approximately equal to but slightly greater than the distance between the sides of the arm 82. In the mounted position shown in FIG. 2, the left section 100 is generally the mirror image of the right section 100.

Having described the preferred embodiment, it will become apparent that various modifications can be made without departing from the scope of the invention as defined in the accompanying claims.

The invention claimed is:

1. A method of providing a plurality of spaced berms, each berm including plant residue and conditioned for receiving seed in a plant row, the method including the steps of:

supporting a single arm having an upper forward frame mounting end directly above the plant row and extending the arm downwardly and rearwardly from the frame mounting end to a tool mounting end located directly above the plant row;

supporting an axle extending transversely on opposite sides of the tool mounting end substantially entirely by the tool mounting end;

mounting first and second rolling basket sections in cantilever fashion to the axle for rotation on the opposite sides of the tool mounting end independently of powered drive structure;

smoothing soil in the plant row, the step of smoothing soil and the step of sizing the plant residue including rotating the rolling basket sections by contacting the basket sections with the ground on opposite sides of the plant row and moving the single arm forwardly over the ground while the arm is generally aligned with the plant row;

supporting an adjacent rolling basket section having an outermost extremity located offset from the second rolling basket sections; and rotating adjacent rolling basket section to direct the residue from the second rolling basket section and the adjacent rolling basket section to an area devoid of rolling basket section mounting structure.

2. The method as set forth in claim 1 wherein the step of rotating the rolling basket sections includes rotating innermost sides of the basket sections closely adjacent the tool mounting end over the plant row to help clean the basket sections, and rotating outermost sides of the basket sections on opposite sides of the plant row to facilitate shedding of residue.

* * * * *